United States Patent [19]

McCambridge

[11] Patent Number: 4,726,888

[45] Date of Patent: Feb. 23, 1988

[54] ELECTROLYSIS OF WATER

[76] Inventor: Michael McCambridge, 88 Pace Dr. South, W. Islip, N.Y. 11795

[21] Appl. No.: 938,157

[22] Filed: Dec. 4, 1986

[51] Int. Cl.⁴ .............................................. C25F 1/02
[52] U.S. Cl. .................................... 204/129; 204/222; 204/269; 204/270
[58] Field of Search ................. 204/129, 228, 269, 270

[56] References Cited

U.S. PATENT DOCUMENTS

| | | | |
|---|---|---|---|
| 4,218,293 | 8/1980 | Nawrot | 204/270 |
| 4,382,849 | 5/1983 | Spicer | 204/270 |

*Primary Examiner*—R. L. Andrews
*Attorney, Agent, or Firm*—Jerome Bauer; Murray Schaffer

[57] ABSTRACT

Water is decomposed into hydrogen and oxygen gases by impressing alternate ones of a plurality of sheet electrodes a direct current of given polarity having low voltage and high amperage while simultaneously impressing on the cathode and anodes of a plurality of electrolytic cells, individually sandwiched between the sheet electrodes a high voltage and low amperage direct current, while the sheet electrodes and the electrolytic cells are all immersed in an aqueous electrolyte solution.

11 Claims, 1 Drawing Figure

ELECTROLYSIS OF WATER

BACKGROUND OF THE INVENTION

The present invention relates to an electrolytic process and apparatus for decomposing water and in particular for the recovery of hydrogen and/or oxygen gases therefrom.

Hydrogen and oxygen gases do not exist in nature in relatively pure form and it is, therefore, necessary to devise ways for obtaining these gases from the natural compositions of which they are a constituent. While many different methods for recovering hydrogen and oxygen have been devised, the most frequently used method involves the decomposition of water by electrolysis, since water is relatively abundant and inexpensive, and electricity is generally readily available, although somewhat more expensive. The basic electrolytic process for the separation of hydrogen and oxygen gases comprises the passing of a direct electric current between an anode and a cathode arranged in dilute aqueous solution of an alkali (e.g., sodium chloride) thus decomposing the water into its basic constituents.

The generally accepted theoretical voltage for this type of electrolysis is 1.23 volts at room temperature. However, because of the overloading of hydrogen on the electrodes and the internal cell resistance itself, voltages of 2.0 to 2.5 or greater are generally required. A 15 percent sodium chloride solution using iron cathodes and nickel plated iron anodes with an asbestos diaphragm separating the electrode compartments operates at termperatures from 60 to 70 degrees centrigrade producing low yields of hydrogen, relative to the cost of electricity and incidental plant processing costs. Attempts at making the system more efficient by nickel plating the anode or by using more exotic noble metals have been tried. However, most of the known cells produce about 7.0 cubic feett of hydrogen and half as much oxygen per kilowatt hour. While the gases produced are 99.7 percent pure and are even suitable for hydrogenation of edible oils, the return of only 7 cubic feet per kilowatt hour still remains quite costly.

Incidentally, it has been recently proposed to employ hydrogen gas in the operation of internal combustion engines. As a consequence, new attempts have been made in improving electrolytic cells, so as to reduce not only costs, but to improve the hydrogen yield. To this end, reference may be made to U.S. Pat. Nos. 4,608,137, 4,528,947; 4,384,941; and 3,648,668. Notwithstanding the many attempts to improve electrolytic cell construction and the method for decomposing water and even the use of exotic materials, the efficiency of such cells have not been greatly improved over the basic parameters known for some time.

It is an object of the present invention to provide an improved process for the decomposition of water into hydrogen and oxygen gases which has greater efficiency and employs less power than heretofore known.

It is another object of the present invention to provide a continuous process for producing hydrogen and oxygen gas in an electrolytic cell which overcomes the disadvantages and inherent difficulties of the known devices. It is yet another object of the present invention to provide a electrolytic cell which is simple, non-corrosive and durable.

These objects together with other objects and advantages will be apparent from the following description.

SUMMARY OF THE INVENTION

According to the present invention, a method of decomposing water into hydrogen and oxygen gases is provided wherein alternate sheet electrodes are impressed with a direct current of given polarity having low voltage and high amperage while simultaneously impressing on the cathode and anodes of a plurality of electrolytic cells, individually interspersed between the sheet electrodes, a high voltage and low amperage direct current, while the sheet electrodes and the electrolytic cells are all immersed in an aqueous electrolyte solution.

The apparatus for decomposing the water into hydrogen and oxygen gases, in accordance with the present invention comprises a receptacle for containing the water to be decomposed into which a plurality of sheet electrodes are arranged and spaced in parallel relationship to each other. Electrolytic cells, each having at least one cathode and one anode member are sandwiched between the sheet electrodes in close proximity therewith. The sheet electrodes are alternately connected to the respective poles of a source of direct current having low voltage and high amperage while the cathode and anode members of the electrolytic cells are connected to the corresponding poles of a source of direct current having high voltage and low amperage. The apparatus is operated by applying the current simultaneously to the set of electrodes and the sets of cathode/anodes.

In carrying out the present method with the apparatus described, a synergistic effect seems to occur between the electrolytic cells having high voltage and low amperage by which the electrolysis is chiefly carried out, caused by the proximity of the adjacent sheet electrodes having low voltage and high amperage. This arrangement seems to increase the rapidity at which the ions are exchanged and the water is decomposed and thus provide higher yields of oxygen and hydrogen gases with greater efficiency.

It is preferred that the cathode and anode members of each of the electrolytic cells are in the form of rectilinear plates arranged in planes parallel to each other and perpendicular to the sheet electrodes. The anode and cathode plates alternating in a spaced vertical stack and being supported in an interconnected manner by common conductive rods and buses which connect the respective anode and cathode rods to the respective poles of the source of current.

The receptacle is provided with means for feeding water to it, to maintain a selective level of water in which the sheet electrodes and cathode and anode plates are immersed. Suitable controls are provided for automatically maintaining the level in response to the utilization or decomposition of the water and/or the production of the gases. Preferably the receptacle is a hermetically enclosed tank and is provided with duct means for withdrawing the gases therefrom and conduit means for feeding the water thereto, all of which sealingly pass through the walls of the tank.

Full details of the present invention are set forth in the following description and are illustrated in the accompanying drawings.

DESCRIPTION OF THE INVENTION

Figure 1:
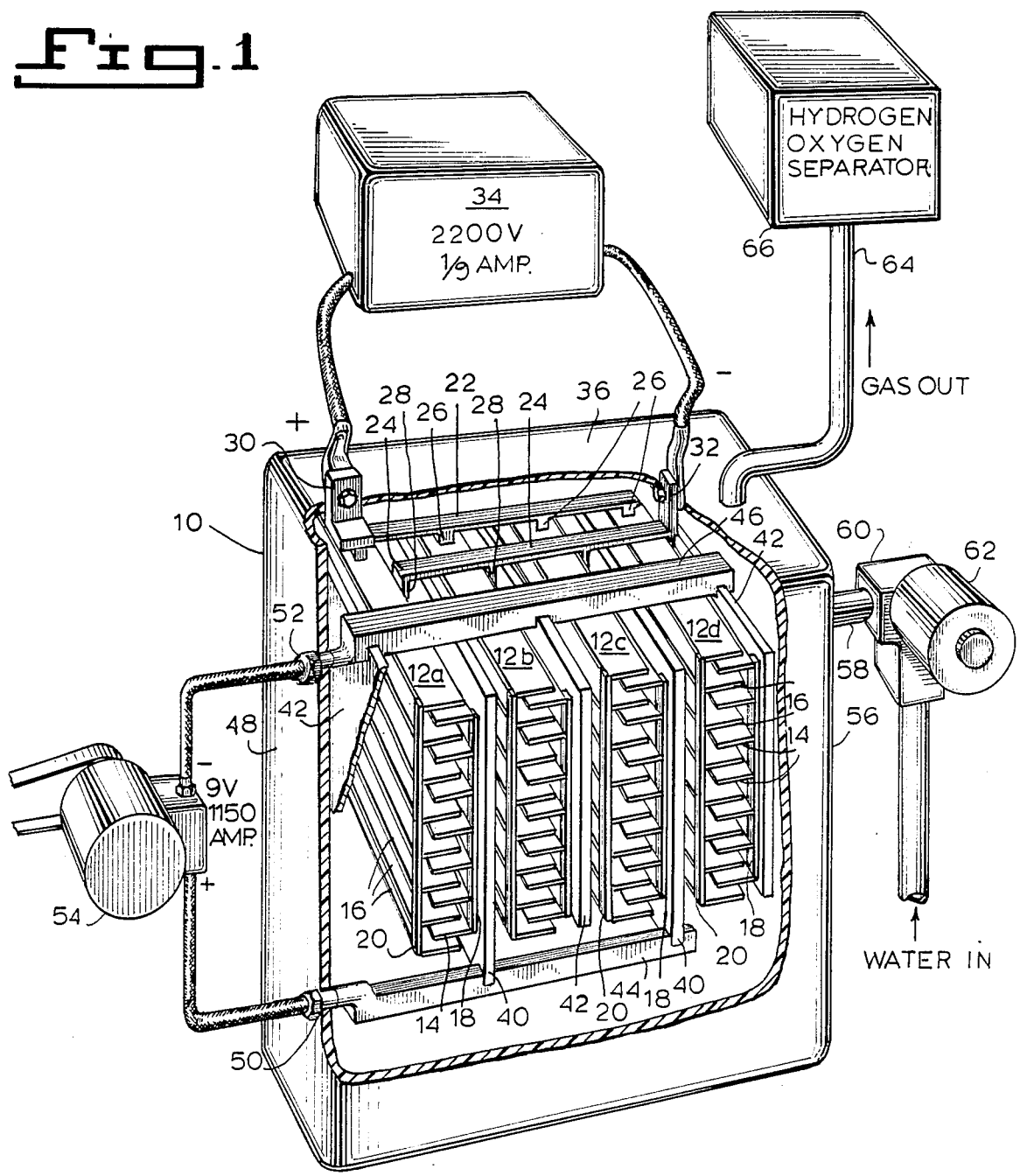
FIG. 1 is a schematic diagram of an electrolytic cell illustrating both the apparatus and the process of the present invention.

The broad concepts of the present invention can best be understood by considering an exemplary form of apparatus for the decomposition of water. As seen in the drawing, the exemplary apparatus comprises an inert, preferably high density plastic hermetically enclosed and sealed tank 10. Arranged within the tank 10 are a plurality of electrolytic cells 12a–d, each formed of a stack of alternating horizontally disposed high voltage anode plates 14 and cathode plates 16. In the drawings, four such electrolytic sets are illustrated, although the number is not at all critical. Similarly, the number of anode plates 14 and cathode plates 16 are not critical although they are preferably arranged in pairs.

The individual high voltage anode plates 14 and cathode plates 16 are approximately 10 inches long, two inches wide and one and one-half inches thick and are horizontally spaced from each other by about 3/16ths of an inch. The anode plates 14 and the cathode plates 16 in each set are held together by vertically disposed supports 18 and 20, respectively, adjacent the forward and rear ends of the plates. The supports 18 and 20 are preferably flat, although round rods may be used but should have such strength and rigidity as to be able to support the plates in the disposition described. The supports or rods 18 and 20 are of a highly conductive metal, so as to, in effect, not only support the plates, but also be a conductor bus for them.

Extending across the top of the grouped cells 12a–d are a pair of high voltage bus bars 22 and 24, respectively. Bus bar 22 is formed with short depending legs 26 which are welded or otherwise fixedly fastened to the topmost cathode plate in each of the cells 12a–d. The bus bar 24 while similarly formed, has slightly longer depending legs 28 which are welded or fixedly fastened to a vertical support rod 18 of each cell 12a–d, although, if desired, the legs 28 may be similarly welded or fastened directly to the topmost anode plate in each cell. Each of the high voltage bus bars 22 and 24 are welded or bolted to a highly conductive metal angle bracket 30 and 32, respectively, each serving as a conductor pole for connection to a source 34 of high voltage/low amperage current. The brackets 30 and 32 are set within the top wall 36 of the tank 10 by known conventional means so that they are securely fixed and are able to support the grouped electrolytic cells 12a–d freely depending from their associated buses 22 and 24. Because of the size of the plates, bus bars, supporting rods, etc. the cathode/anode cells are maintained in fixed, spaced disposition, as described relative to each other without the need for further supporting means, although such supporting means may be used if they are also desired.

The electrolytic cells 12a–d are sandwiched between vertical low voltage sheets 40 and 42 of alternate polarity. The vertical sheets 40 and 42 are about 10 inches long and have a height coextensive with that of each of the electrolytic cells 12a–d and a thickness slightly thicker than the individual anode or cathode plates 14 and 16. The vertical low voltage sheets 40 and 42 are positioned between and straddle the adjacent electrolytic cells 12a–d so as to be as close to the edges of the high voltage anode plates 14 and cathode plates 16 as is possible without contacting them. The sheets 40, which constitute anode electrodes, are welded or fixedly fastened to a common low-voltage bus 44 while the sheets 42 which constitute the cathode electrodes are connected likewise to a common low-voltage bus 46. The buses 44 and 46 extend in the horizontal direction outwardly of the side wall 48 of the tank 10 being rigidly secured in the wall 48 so as to support the plates 40 and 42. Supplementary supporting brackets may be used, if desired. Each of the buses 44 and 46 are connected to a conductor bracket 50 and 52 respectively which are connected to a source 54 of low voltage/high amperage current, with the polarities as indicated.

Extending through the opposite wall 56 of the tank 10 is an inlet duct 58 which is connected via a flow control valve 60 and a pump 62 to a source of water. Both the flow control valve 60 and the pump 62 are conventional, the valve being preferably remotely controlled as by the use of solenoid controls, so that water flow can be selectively regulated to insure a constant uniform throughput and operation of the electrolytic cell. Suitable controls regulating the level of water, in response to the gas output, can be provided. Extending out of the top wall 36 is an air duct 64 through which the gases produced in the tank 10 under the electrolytic process can be withdrawn. The duct 64 leads to a hydrogen-/oxygen separator 66 of known construction so that the gases may be separated and separately contained and stored.

Preferably, the source of water, not shown, is premixed with a selected electrolyte, so that the water solution initially supplied to the tank 10 has the desired concentration of the electrolyte. As an alternative, a separate source of the electrolyte can be provided and separately introduced into the water pump, water conduit or directly into the tank. The tank 10 is provided with water level indicators, temperature gauges, pressure gauges and the like, as would be well known to those skilled in this art which operate to regulate the subsequent feeding of water to maintain the acid concentration at the desired level. Because during decomposition the conversion of the water to gas results in increased concentration of the electrolyte, the subsequent feeding of water can be generally made without added electrolyte.

In accordance with the present invention, all of the high voltage anode/cathode plates 14 and 16, as well as the low voltage electrodes 40 and 42 are formed of a ferrous metal base, coated with a layer of platinum, the depth of thickness of which is not critical. The source of current 32 for the high voltage plates is preferably a transformer having an output of 2,200 volts and 1/9 amp current (the commercially available transformer employed to operate household oil burner systems is such a transformer). The low voltage source is preferably a 23 to 30 hp generator producing 9 volts and 1.50 amps (e.g. automobile generator). The electrolyte is sulfuric acid which when mixed with water provides a solution in the range of a 2 to 20 percent aqueous concentration, although concentration of 10–15 is preferred.

Prior to operating the electrolytic cell, the electrolyte solution is introduced into the tank 10 until all of the plates are fully immersed. Once the system is filled and electric current supplied to the respective plates, the electrolytic process is initiated and continues on without hindrance, so that a continuous decomposition of the water results and gases are produced which are ducted outwardly through the duct 58. During subsequent electrolysis, water and electrolyte to maintain the desired concentration is continuously added to maintain the water level and the electrolyte solution at the predetermined concentration. Since the electrolysis result in the depletion of the water/electrolyte solution, the concentration of electrolyte increases as the process proceeds. Therefore, only water need be continuously fed to insure proper level in the tank. Additional electrolyte may be added periodically and/or only when needed.

It is believed that the high voltage plates 14 and 16, forming the electrolytic cells 12a-d actually provide the major electrolysis while the low voltage electrodes 40 and 42 act to reduce the resistance of the electrolyte to the high voltage/low amperage current. This combination unexpectedly enhances the level and speed of the electrolysis and as a result large yields of gases are provided at lower power cost input. The combination of the high voltage/low amperage plates arranged perpendicularly to the low voltage/high amperage electrodes in a box-like formation is deemed to provide a synergistic effect, particularly where the high voltage, but low current is applied to the small but significantly more numerous anode/cathode plates 14 and 16. The arrangement of this relatively small high voltage plates, parallel to each other, provides an extremely large surface area for transfer of ions between anode and cathode and for the carrying out of the electrolytic process.

Further, because of the high yield relative to time, the high concentration of sulfuric acid of anywhere from 10 to 20 percent enables a large conversion of water in the throughput process, without fouling the electrolytic system or causing corrosion.

Lastly, the use of platinum coating for the plates, while presumably considered to be a high cost factor, is believed to eventually result in lower costs, since even though numerous plates and sulfuric acid electrolyte solution are used, the platinum inhibits corrosion so that they do not have to be readily replaced as would the obviously cheaper and conventional plates.

Various structural and procedural embodiments have been described. Various changes, modifications and other embodiments will be apparent to those skilled in the art. It is accordingly intended that the present disclosure be taken as illustrative only of the invention and not limiting of its scope.

What is claimed is:

1. Apparatus for decomposing water into hydrogen and oxygen gases comprising a receptacle for containing water to be decomposed, a plurality of first sheet electrodes arranged and spaced substantially in parallel relationship to each other within said receptacle and a plurality of second sheet electrodes defining a plurality of sets of electrolytic cells each set having at least one cathode and one anode member, interposed between a pair of said sheet electrodes, said first sheet electrodes being alternately connected to the respective poles of a source of direct current having low voltage and high amperage and the cathode and anode members of each of said electrolytic cells being connected to the corresponding poles of a source of direct current having high voltage and low amperage, and means for withdrawing the hydrogen and oxygen gases upon decomposition of the water.

2. The apparatus according to claim 1 wherein said cathode and anode members of said electrolytic cells are rectilinear-shaped plates arranged in planes substantially parallel to each other and substantially perpendicular to said sheet electrodes.

3. The apparatus according to claim 2 wherein the plates forming the anode and cathode members of each electrolytic cell are alternately arranged in a spaced vertical stack, said cathodes being supported in said stack by a first common conductive rod and said anodes being supported in said stack by a second common conductive rod, the rods in each electrolytic cell being connected to a respective common anode and cathode bus.

4. The apparatus according to claim 1 including means for feeding water to said receptacle to maintain a selected level of electrolyte therein.

5. The apparatus according to claim 4 including means for maintaining a selected level of electrolyte concentration within said water.

6. The apparatus according to claim 1 wherein said receptacle is a hermetically sealed and enclosed tank provided with duct means for withdrawing gas therefrom and conduit means for supplying water thereto.

7. The apparatus according to claim 1 wherein the means for supplying direct current to said sheet electrodes comprises a low voltage generator in the range of 9 volts and 1150 amps. and the means for supplying the direct current to said cathode and anode plate comprises a transformer within a range of 2200 volts and 1/9 amps.

8. The method of decomposing water into hydrogen and oxygen gases comprising the step of impressing upon alternate ones of a plurality of sheet electrodes a direct current of given polarity having low voltage and high amperage and impressing upon the cathodes and anodes of a set of elecrolytic cells interposed between said sheet electrodes a high voltage and low amperage direct current, while said sheet electrodes and said electrode cells are immersed in an aqueous electrolyte solution, and withdrawing said hydrogen and oxygen gases from contact with said water.

9. The method according to claim 8 wherein the electrolyte solution comprises a 2 to 20 percent concentration of sulfuric acid in water.

10. The method according to claim 9 wherein said electrolyte solution comprises a 10 to 15 percent concentration of sulfuric acid in water.

11. The method according to claim 9 wherein the cathode and anode of said electrolytic cells are provided with 2200 volts and 1/9 amps and the sheet electrodes are provided with 9 volts and 1150 amps.

* * * * *